(12) United States Patent
Bhise et al.

(10) Patent No.: US 8,965,938 B2
(45) Date of Patent: Feb. 24, 2015

(54) ORPHAN MANAGEMENT IN FILE SYSTEMS (75) Inventors: Tejas N. Bhise, Pune (IN); Srikanth Srinivasan, Pune (IN)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 12/894,429

(22) Filed: Sep. 30, 2010

(65) Prior Publication Data

US 2012/0084332 A1 Apr. 5, 2012

(51) Int. Cl.
*G06F 17/30* (2006.01)
(52) U.S. Cl.
CPC .............................. *G06F 17/30073* (2013.01)
USPC ........................................................ 707/822
(58) Field of Classification Search
CPC ................................................ G06F 17/30067
USPC ........................................................ 707/822
See application file for complete search history.

(56) References Cited

U.S. PATENT DOCUMENTS

| 5,875,444 | A * | 2/1999 | Hughes ................................. 1/1 |
| 6,654,772 | B1 | 11/2003 | Crow et al. |
| 7,546,319 | B1 * | 6/2009 | Srinivasan et al. ..................... 1/1 |
| 2007/0067256 | A1 * | 3/2007 | Zayas et al. ........................ 707/1 |
| 2010/0088271 | A1 * | 4/2010 | Brixius et al. ................. 707/609 |

* cited by examiner

*Primary Examiner* — Rehana Perveen
*Assistant Examiner* — Alexander Khong
(74) *Attorney, Agent, or Firm* — Yee & Associates, P.C.; Thomas E. Tyson (57) ABSTRACT A method, computer program product, and apparatus for managing a file system is presented. An object in the file system is identified in which one of a first pointer from the object to a first folder in the file system and a second pointer from the first folder to the object is incorrect. A number of folders is generated within a second folder in the file system that represents a path from a root of the file system to the first folder. The first pointer for the object is set to a last folder in the number of folders in which the last folder represents the first folder.

15 Claims, 5 Drawing Sheets

ORPHAN MANAGEMENT IN FILE SYSTEMS

BACKGROUND

1. Field

The disclosure relates generally to an improved data processing system and more specifically to file system management in a storage device.

2. Description of the Related Art

Data stored in data processing systems are often stored on storage devices. One non-limiting example of a storage device is a hard drive. Prior to storing data on the storage device, an operating system generates a partition on the storage device. The operating system then generates a file system within the partition on the storage device.

The file system allows the operating system to store data on the storage device, locate data on the storage device, and retrieve data on the storage device. For example, the file system may contain a listing of files stored on the storage device and addresses on the storage device for the data that constitute each file. The file system may store data in objects within the file system. Some examples of objects in a file system are folders and files.

Of course, the file system may contain other items used by the operating system to manage the data within the file system. For example, the file system may contain an identifier for the file system, an identifier for the type and version of the file system, and a mapping of locations for the files and folders stored in the file system. The items may be generated in the file system to implement a particular standard. For example, a file system may be an ext3 file system. An ext3 file system stores data in blocks, and each block of data is in a group. The ext3 file system also stores metadata about the file system, as well as each group of blocks.

In some file systems, one or more pointers are associated with a first object in the file system. One pointer associated with the object may contain an identifier for a second object contained within the first object. For example, the first object may be a folder, and the folder is associated with a pointer that contains an identifier for a file contained in the folder. Additionally, another pointer associated with an object in the file system may contain an identifier for a parent object of the object. For example, a file stored in the file system may be associated with a pointer to the folder containing the file.

At times, one or more pointers associated with an object in the file system may become inconsistent. A pointer associated with a first object is inconsistent when the pointer contains an identifier of a second object that is not associated with a pointer that contains the identifier of the first object. In other words, a parent object for a child object may have an inconsistent pointer if a pointer associated with the child object points to the parent object, but the parent object is not associated with a pointer that points to the child object. Likewise, a child object of a parent object may have an inconsistent pointer if a pointer associated with the parent object points to the child object, but the child object is not associated with a pointer that points to the parent object.

SUMMARY

The different illustrative embodiments provide a method, computer program product, and apparatus for managing a file system. In an illustrative embodiment, an object in the file system is identified in which one of a first pointer from the object to a first folder in the file system and a second pointer from the first folder to the object is incorrect. A number of folders is generated within a second folder in the file system that represents a path from a root of the file system to the first folder. The first pointer for the object is set to a last folder in the number of folders in which the last folder represents the first folder.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. The computer readable media may be a computer readable storage media or a computer readable signal media. More specific examples (a non-exhaustive list) of the computer-readable medium storage would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. Examples of computer readable signal media include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
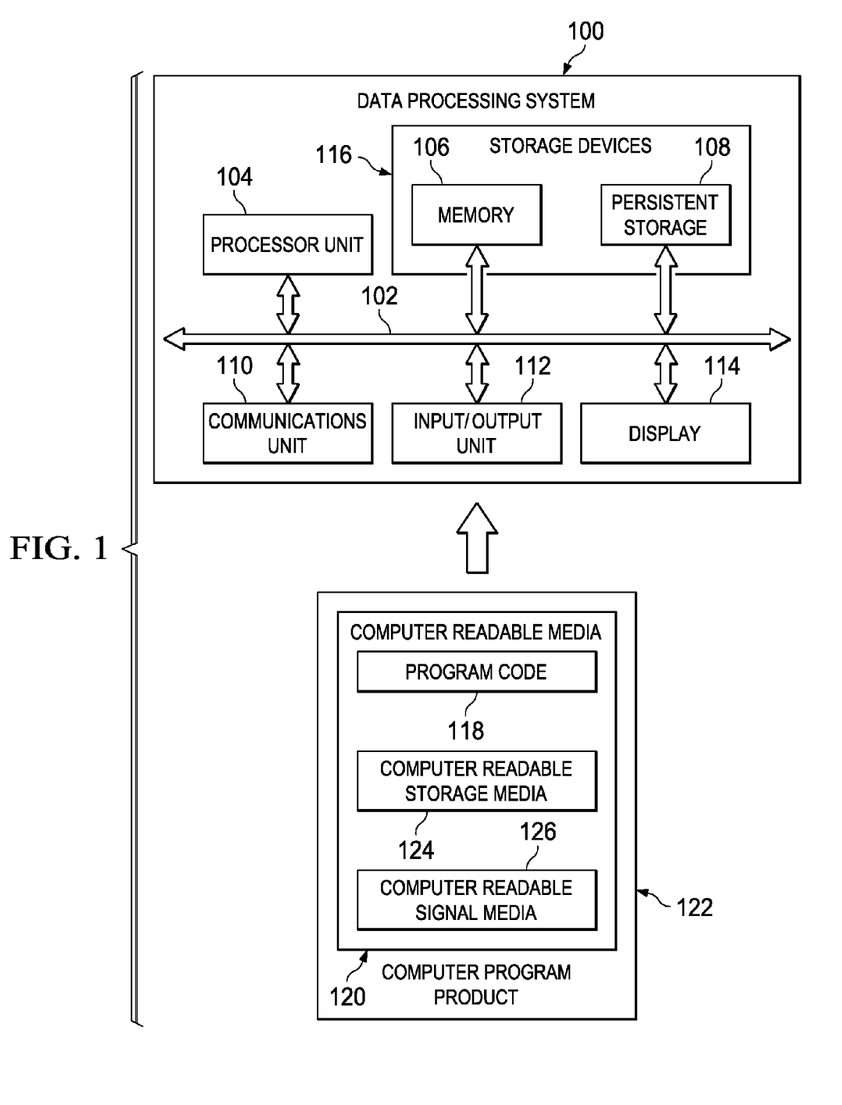
FIG. 1 is an illustration of a data processing system depicted in accordance with an illustrative embodiment.

Turning now to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a number of processors, a multi-processor core, or some other type of processor, depending on the particular implementation. A number, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Storage devices 116 may also be referred to as computer readable storage devices in these examples. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 104 may take the form of a hardware unit that has circuits that are manufactured or configured for a particular use. This type of hardware may perform operations without needing program code to be loaded into a memory from a storage device to be configured to perform the operations.

For example, when processor unit 104 takes the form of a hardware unit, processor unit 104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 118 may be omitted because the processes for the different embodiments are implemented in a hardware unit.

In still another illustrative example, processor unit 104 may be implemented using a combination of processors found in computers and hardware units. Processor unit 104 may have a number of hardware units and a number of processors that are configured to run program code 118. With this depicted example, some of the processes may be implemented in the number of hardware units, while other processes may be implemented in the number of processors.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

The different illustrative embodiments recognize and take into account a number of different considerations. For example, the different illustrative embodiments recognize that file systems may become inconsistent. A file system may become inconsistent due to electric power fluctuations, hardware inconsistencies, operating system inconsistencies, magnetic fluctuations, or from other types causes.

More specifically, pointers associated with objects in the file system may become inconsistent. For example, a pointer associated with a first object is inconsistent when the pointer contains an identifier of a second object that is not associated with a pointer that contains the identifier of the first object. In other words, a parent object for a child object may have an inconsistent pointer if a pointer associated with the child object points to the parent object, but the parent object is not associated with a pointer that points to the child object. Likewise, a child object of a parent object may have an inconsistent pointer if a pointer associated with the parent object points to the child object, but the child object is not associated with a pointer that points to the parent object.

An object in the file system with an inconsistent pointer is referred to herein as an orphan. For example, a file that is an orphan is referred to as an orphaned file. Likewise, a folder that is an orphan is referred to herein as an orphaned folder.

The different illustrative embodiments also recognize and take into account that a file system having orphaned objects may be repaired. The file system may be repaired by setting a pointer associated with an orphaned object to an identifier for another object in the file system. For example, when a pointer to a parent object that is associated with an object is inconsistent, the pointer may be set to an identifier of another object in the file system. More specifically, a pointer to a parent object of an orphaned file in the file system may be set to the identifier for a particular folder in the file system. In some illustrative embodiments, the folder is a "lost+found" folder.

The different illustrative embodiments recognize, however, that a folder in the file system may have a link count associated with the folder. The link count of a folder is a number of objects stored in the folder. The link count may only be incremented for objects stored on a hierarchical level immediately below the folder. For example, the link count of a folder may be not be incremented for an object stored in a subfolder of the folder.

Increasing the number of objects in the folder such that the link count is larger than the maximum value that may be stored in the location of the link count in the storage device may cause additional inconsistencies in the file system. Such a value is referred to as a maximum link count. For example, the operating system may be unable to identify the correct number of objects within the folder.

The different illustrative embodiments recognize that storing orphaned files in subfolders of the folder to which the pointer for the parent object of an object in the file system allows the folder to contain a greater number of objects than the maximum link count. Additionally, by generating subfolders within the folder that represent the path of the object to which the pointer for the parent object of the object points, a human examining the folder may identify a possible path in the file system where the object belongs. In other words, the human may identify the path at which the object may have been located prior to the start of the inconsistency.

Thus, the different illustrative embodiments provide a method, computer program product, and apparatus for managing a file system. In an illustrative embodiment, an object in the file system is identified in which one of a first pointer from the object to a first folder in the file system and a second pointer from the first folder to the object is incorrect. A number of folders is generated within a second folder in the file system that represents a path from a root of the file system to the first folder. The first pointer for the object is set to a last folder in the number of folders in which the last folder represents the first folder.

Figure 2:
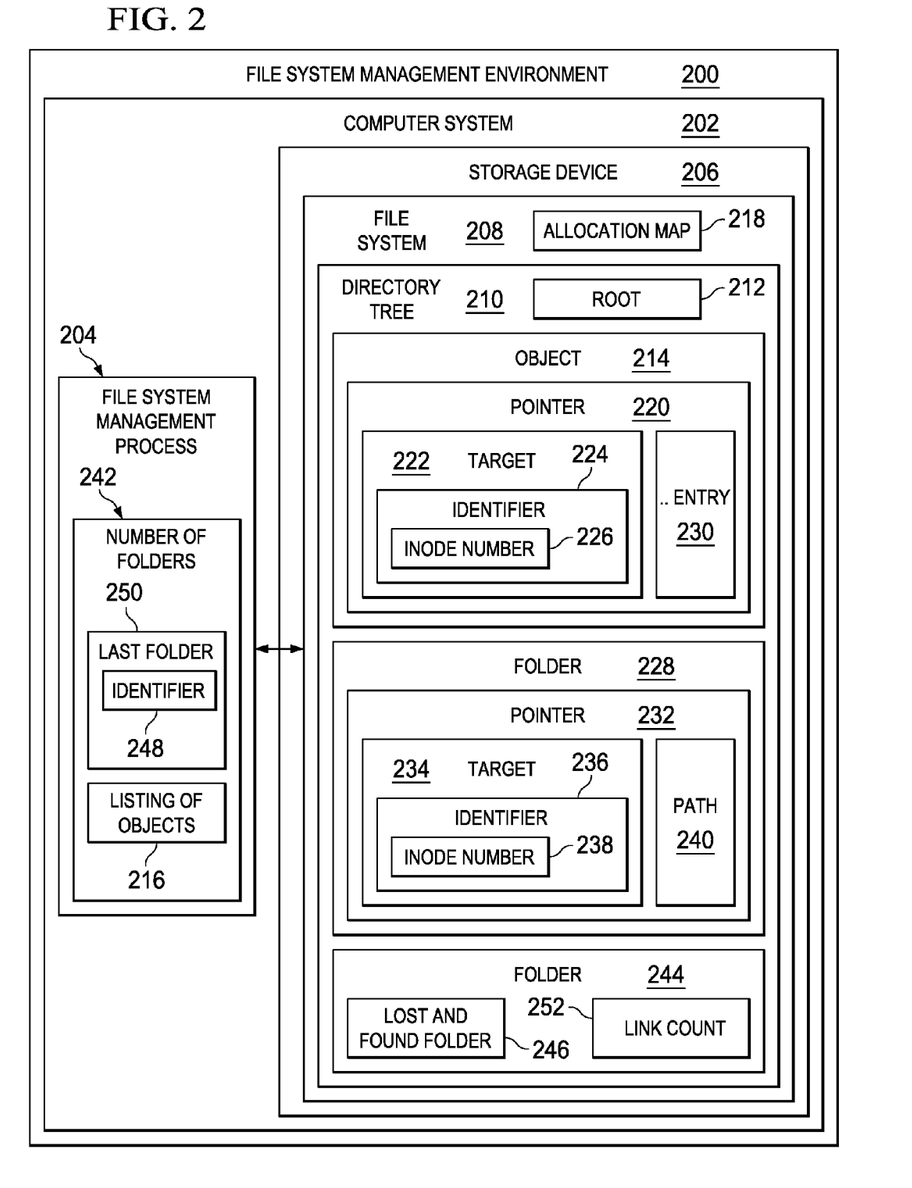
FIG. 2 is an illustration of a file system management environment depicted in accordance with an illustrative embodiment.

Turning now to FIG. 2, an illustration of a file system management environment is depicted in accordance with an illustrative embodiment. File system management environment 200 is an example of a file system management environment in which illustrative embodiments may be implemented. In an illustrative embodiment, file system management environment 200 is implemented in computer system 202. Computer system 202 is an example implementation of data processing system 100 in FIG. 1.

File system management environment 200 contains computer system 202. Computer system 202 runs file system management process 204. File system management process 204 processes data on storage device 206. Storage device 206 is an example implementation of storage devices 116 in FIG. 1. Storage device 206 may be connected to computer system 202. Alternatively, storage device 206 may be connected to a remote computer system and accessible to computer system 202 over a network using a communications unit, such as communications unit 110 in FIG. 1.

Storage device 206 contains file system 208. File system 208 is a system for organizing and storing data on storage device 206. File system 208 allows an operating system running on computer system 202 to locate and retrieve data stored on storage device 206. In these examples, storage device 206 contains file system 208. However, in other illustrative embodiments, storage device 206 may contain additional file systems. Additionally, file system 208 is an extended file system version 3 (ext3) file system in these examples. However, file system 208 may be an extended file system (ext), extended file system (ext2), a new technology file system (NTFS), or another suitable file system.

File system 208 consists of directory tree 210. Directory tree 210 is a hierarchical organization of data in file system 208. More specifically, directory tree 210 contains a hierarchy of folders. Each folder in the hierarchy may be associated with one or more files. A folder that is associated with a file is referred to as containing the file. Each file may contain a portion of the data stored on storage device 206. Each file may be contained in one folder, but each folder may contain one or more files.

Directory tree 210 contains root 212. Root 212 is a folder in file system 208 that is at the highest hierarchical level of the directory tree 210. Root 212 may contain folders, but no folder contains root 212 because root 212 is at the highest hierarchical level of directory tree 210. In these examples, root 212 has a path of "/" in file system 208. Object 214 is an entity stored in file system 208. Object 214 may be a file or a folder.

File system management process 204 begins processing file system 208. File system management process 204 may initiate processing of file system 208 in response to a user input, an expiration of a period of time, a system event, or another suitable event. A system event may be the occurrence of a condition within computer system 202. The condition may be, for example, starting an operating system for computer system 202 after an improper shutdown of the operating system. Alternatively, the system event may be detection of an inconsistency in file system 208.

File system management process 204 processes file system 208 by identifying objects in file system 208 in which one of a pointer from the object to the folder containing the object and a pointer from the folder containing the object to the object is incorrect. More specifically, file system management process 204 identifies orphaned objects in file system 208. An orphaned object is an object in file system 208 that has a pointer from the orphaned object to a parent folder, but the parent folder does not contain a pointer to the orphaned object. In other words, an orphaned object is an object that does not identify a containing folder which also identifies the orphaned object as being contained in the containing folder.

In this illustrative example, object 214 is associated with pointer 220. Pointer 220 is a reference to target 222. In other words, pointer 220 may be used to find target 222. Target 222 is identifier 224 in these examples. Identifier 224 is another location in file system 208. Identifier 224 represents the folder that contains object 214. In this illustrative example, identifier 224 represents folder 228. Identifier 224 may be represented as inode number 226. Inode number 226 is an identifier for an inode. An inode is a data structure that contains metadata about an object, such as object 214, and pointers to the locations on storage device 206. In other words, identifier 224 may be inode number 226 corresponding to folder 228 in file system 208. As a non-limiting example, pointer 220 may be ".." entry 230 in file system 208 when file system 208 uses ".." entry 230 to represent a folder that contains object 214.

File system management process 204 identifies folder 228 as being the object in file system 208 with identifier 224. In an illustrative example in which identifier 224 does not correspond to a folder in file system 208, object 214 is identified as an orphan. Folder 228 is associated with pointer 232. Pointer 232 is a reference to an object contained in folder 228. Pointer 232 identifies target 234. Target 234 of pointer 232 may be represented using identifier 236. In these examples, identifier 236 is inode number 238.

File system management process 204 then determines whether identifier 236 corresponds to object 214. In other words, file system management process 204 determines whether identifier 236 is the identifier in file system 208 for object 214. In these examples, file system management process 204 determines whether inode number 238 is the same as the inode number of object 214 in file system 208. In the event that identifier 236 is not the identifier in file system 208 for object 214, file system management process 204 identifies object 214 as an orphaned object. In the event that identifier 236 is the identifier in file system 208 for object 214, object 214 is not identified as an orphaned object.

File system management process 204 may also identify object 214 as being an orphan by generating listing of objects 216. Listing of objects 216 is a listing of all objects in file system 208. The listing may contain an identifier for the objects. For example, listing of objects 216 may contain an inode number for each object. An inode is a data structure that contains metadata about an object, such as object 214, and pointers to the locations on storage device 206 at which the data that makes up object 214 is located.

File system management process 204 then traverses directory tree 210. Traversing means that file system management process 204 processes the contents of each folder in directory tree 210 by following the hierarchy of folders in directory tree 210. In each folder, file system management retrieves an identifier for each object contained in the folder and adds the identifier to listing of objects 216. Once all folders have been processed by file system management process 204, file system management process 204 processes allocation map 218. Allocation map 218 is a listing of identifiers for all objects that have been allocated in file system 208. Allocating an object means marking locations on storage device 206 as belonging to the object. An object is allocated when the object is created in file system 208 and/or modified.

File system management process 204 compares listing of objects 216 to allocation map 218. If an identifier for object 214 is stored in allocation map 218 but not stored in listing of objects 216, file system management process 204 identifies object 214 as an orphan. If an identifier for object 214 is stored in both allocation map 218 and listing of objects 216, file system management process 204 does not identify object 214 as an orphan.

Once file system management process 204 identifies object 214 as an orphaned object, file system management process 204 identifies path 240 of folder 228 when identifier 224 corresponds to folder 228. Path 240 is the ordered hierarchy of folders in directory tree 210 that contains folder 228. Path 240 is represented as the names of the ordered hierarchy of folders beginning at root 212 and ending with folder 228. For example, path 240 may be "/folder1/subfolder1" where "/" represents root 212, "folder1" represents the folder that contains folder 228, and "folder2" represents folder 228.

Once file system management process 204 identifies path 240, file system management process 204 generates number of folders 242 within folder 244. In these examples, folder 244 is lost and found folder 246. Number of folders 242 represent path 240 of folder 228. In other words, each folder in number of folders 242 has the name of the corresponding folder in path 240 that leads to folder 228. Of course, file system management process 204 may not generate number of folders 242 if number of folders 242 already exists within folder 244.

For example, assume path 240 is "/folder1/subfolder1" in directory tree 210. File system management process 204 generates number of folders 242 within folder 244. Assume folder 244 has the path "/lost+found" in directory tree 210. File system management process 204 generates "folder1/subfolder1" within "/lost+found," which yields "/lost+found/folder1/subfolder1."

File system management process 204 then sets target 222 of pointer 220 to identifier 248 of last folder 250. Last folder 250 is the folder in number of folders 242 that is lowest in the ordered hierarchy of number of folders 242. For example, "subfolder1" is the lowest folder in the ordered hierarchy of "folder1/subfolder1." Thus, file system management process 204 reproduces path 240 of folder 228 within folder 244 and associates object 214 with last folder 250 in number of folders such that object 214 is contained in last folder 250. In illustrative embodiments in which folder 228 has pointer 232 with target 234 of identifier 236 and identifier 236 corresponds to object 214, pointer 232 may be removed and/or dissociated from folder 228.

Alternatively, in some illustrative embodiments, identifier 224 may point to an object in file system 208 other than a folder or an inconsistent or empty location in file system 208. In such illustrative embodiments, file system management process 204 sets identifier 224 to the identifier of folder 244.

Link count 252 of folder 244 is incremented only for each folder that is within folder 244 on the immediate hierarchical level below folder 244. Link count 252 is metadata for folder 244 that identifies the number of objects contained in folder 244 on the immediate hierarchical level below folder 244. For example, assume "/lost+found" contains "/lost+found/folder1" and "/lost+found/folder2," where "lost+found" represents folder 244. Link count 252 of folder 244 is two. In such an illustrative example, ten files and ten folders may thereafter be associated with "folder1" and/or "folder2," but link count 252 is not incremented. Link count 252 is incremented, however, when "folder3" is associated with "/lost+found" such that the path of "folder3" is "/lost+found/folder3."

The illustration of computer system 202 in file system management environment 200 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, without limitation, in some illustrative embodiments, folder 228 is associated with more than one pointer 232. In such illustrative embodiments, folder 228 contains multiple objects. The objects may consist of files and/or folders. Additionally, in some illustrative embodiments, identifier 224 is not represented by inode number 226 and identifier 236 is not represented by inode number 238. In such illustrative embodiments, identifier 224 may consist of one or more addresses on storage device 206 or another suitable identifier.

Figure 3:
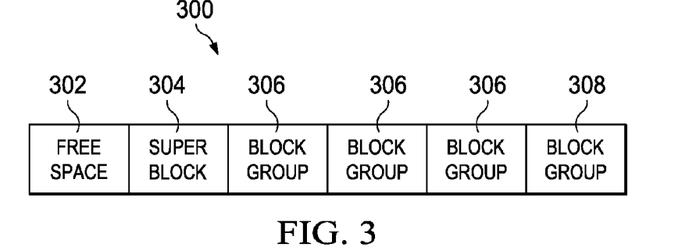
FIG. 3 is an illustration of a block diagram of a storage device depicted in accordance with an illustrative embodiment.

Looking specifically at FIG. 3, an illustration of a block diagram of a file system is depicted in accordance with an illustrative embodiment. File system 300 is an example implementation of file system 208 in FIG. 2. The sequence of elements in file system 300 is depicted in order of storage on a storage device in some illustrative embodiments.

Free space 302 is space in file system 300 in which no data is stored. The size of free space 302 may be set according to a specification for file system 300. For example, the size of free space 302 may be set according to the specification for the ext3 file system. Super block 304 is a block containing metadata about file system 300. Super block 304 may contain information such as a type for file system 300, size of file system 300, status of file system 300, and/or other suitable metadata. Super block 304 may also contain pointers to the locations of block groups 306.

Figure 4:
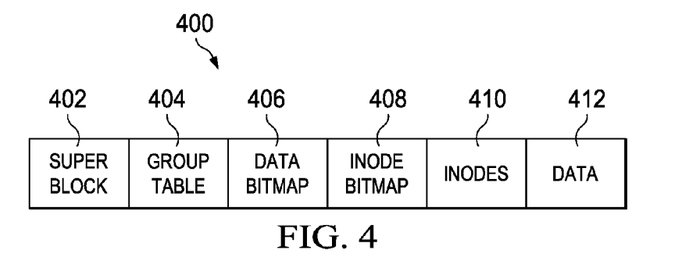
FIG. 4 is an illustration of a block diagram of a block group depicted in accordance with an illustrative embodiment.

Block groups 306 are groups of blocks in file system 300 that consist of data stored in file system 300. Block group 400 in FIG. 4 depicts each of block groups 306 with additional detail. The size of block groups 306 may be the same, and the size of block groups 306 may be contained in super block 304. Block group 308 is the last block group in file system 300. Block group 308 may be a different size than block groups 306.

Turning now to FIG. 4, an illustration of a block diagram of a block group is depicted in accordance with an illustrative embodiment. Block group 400 is an example implementation of a block group in block groups 306 in FIG. 3.

Block group 400 contains super block 402. Super block 402 is a duplicate of super block 304. Block group 400 contains super block 402 in the event that super block 304 becomes unreadable. Group table 404 contains the block number within block group 400 of data bitmap 406. Data bitmap 406 is a mapping for the contents of block group 400. The mapping may indicate which bits within block group 400 are used and which blocks within block group 400 are presently unused for data storage.

Group table 404 also may contain the block number of inode bitmap 408. Inode bitmap 408 is a mapping that indicates which inodes assigned to block group 400 are used and which inodes are presently unused. Block group 400 may also contain the block number of the first block of an inode table. The inode table indicates a location for each inode in block group 400. The inode table may be organized by inode number. Block group 400 may also contain the number of free blocks, the number of free inodes in block group 400, and the number of inodes allocated to folders in block group 400.

Inodes 410 represent the inodes associated with data 412 stored in block group 400. An inode in inodes 410 consists of metadata about an object stored in data 412 and a pointer to the locations of the object within block group 400. Data 412 consists of the bits that make up objects, such as files and folders in block group 400.

Figure 5:
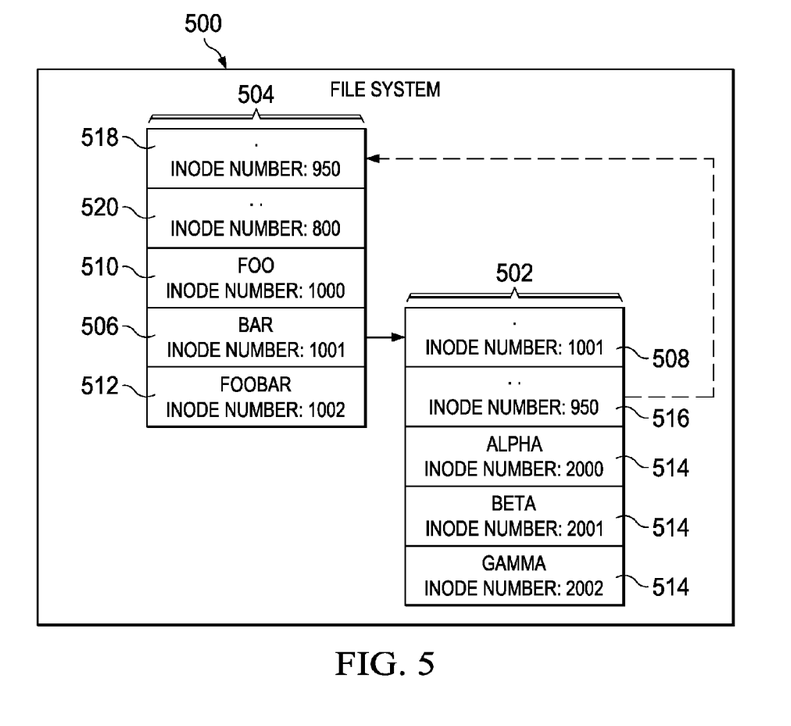
FIG. 5 is another illustration of a block diagram of a file system depicted in accordance with an illustrative embodiment.

Looking now to FIG. 5, another illustration of a block diagram of a file system is depicted in accordance with an illustrative embodiment. File system 500 is an example implementation of file system 208 in FIG. 2. Object 502 is an example implementation of object 214 in FIG. 2. Object 502 is a folder in this illustrative example. Folder 504 is an example implementation of folder 228 in FIG. 2.

Assume folder 504 has a path of "/home/user" in file system 500. In this illustrative example, folder 504 contains object 502 by being associated with pointer 506. Pointer 506 has a target of inode number 1001. Object 502 has entry 508, which indicates that object 502 has inode number 1001 in file system 500. In this illustrative example, folder 504 also contains object 510 and object 512. Likewise, object 502 contains objects 514.

Folder 504 is associated with pointer 520. Pointer 520 has a target of inode number 800. In this illustrative example, inode number 800 represents the folder "/home" because folder 504 has the path "/home/user" in file system 500. Object 502 is associated with pointer 516. Pointer 516 has a target of folder 504. Pointer 516 indicates that the parent object of object 502 is the folder with inode number 950, and folder 504 has entry 518 indicating that folder 504 is represented by inode number 950. In this illustrative example, pointer 516 and pointer 520 are correct.

Figure 6:
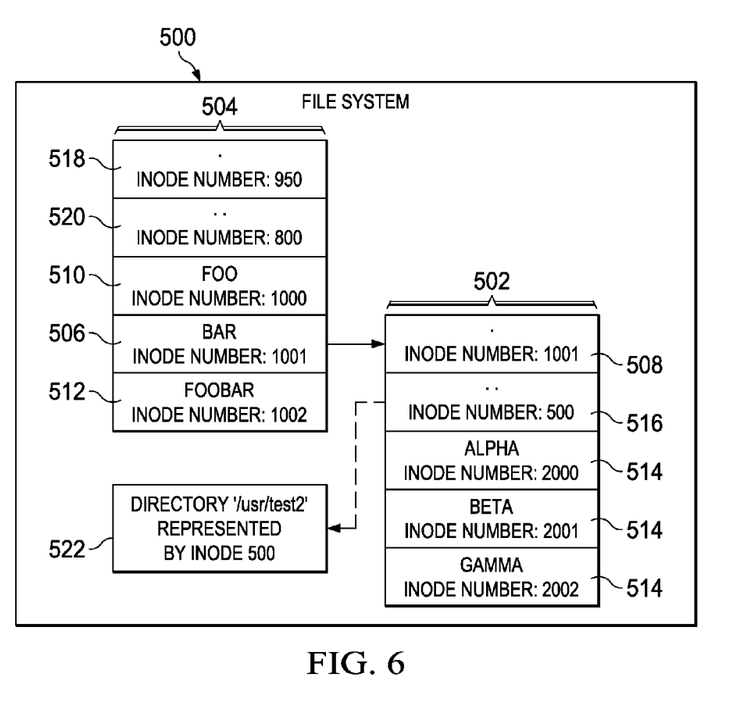
FIG. 6 is a third illustration of a block diagram of a file system is depicted in accordance with an illustrative embodiment.

Turning now to FIG. 6, a third illustration of a block diagram of a file system is depicted in accordance with an illustrative embodiment. In this illustrative example, assume an inconsistency in file system 500 has developed. For example, assume that an electrical inconsistency has caused an inconsistency to develop in file system 500.

In this illustrative example, pointer 516 has been modified. The target of pointer 516 is now folder 522. Folder 522 has the path "/usr/test2" in file system 500. However, folder 504 is still associated with pointer 506. Pointer 506 indicates that object 502 is contained in folder 504. Pointer 516 is now incorrect because object 502 has a pointer to a parent object that is not the same as the folder that has a pointer to object 502 as containing object 502. Thus, object 502 is an orphan.

A file system management process now processes file system 500. The file system management process identifies that pointer 506 has a target of object 502, but object 502 is associated with pointer 516, representing that the parent object of object 502 is folder 522. The file system management process determines that folder 522 is a valid folder in file system 500. Thus, the file system management process removes pointer 506 from folder 504. The file system management process then creates a path representing folder 522 within the "/lost+found" folder. In this illustrative example, the path created is "/lost+found/usr/test2" in file system 500. The file system management process sets the target of pointer 516 to the new folder "test2" at "/lost+found/usr/test2" in file system 500.

Figure 7:
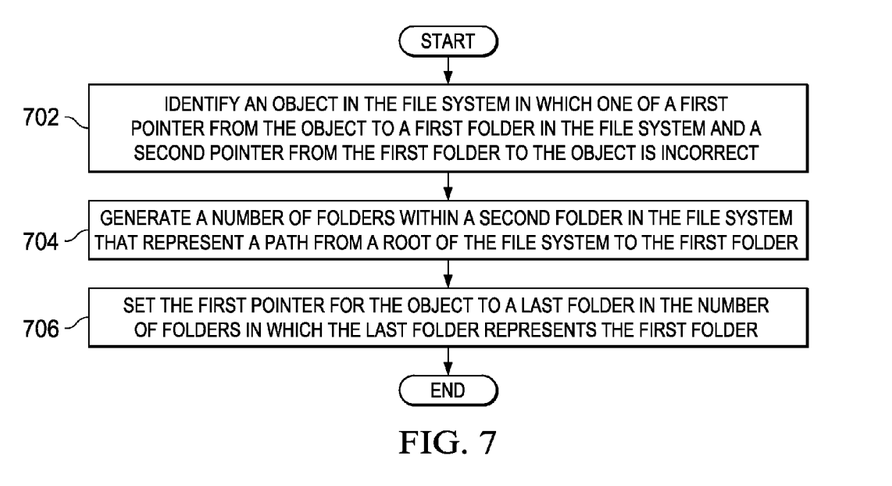
FIG. 7 is a flowchart of a process for managing a file system depicted in accordance with an illustrative embodiment.

Looking specifically at FIG. 7, a flowchart of a process for managing a file system is depicted in accordance with an illustrative embodiment. The process may be performed by file system management process 204 running on computer system 202 in FIG. 2. The process identifies an object in the file system in which one of a first pointer from the object to a first folder in the file system and a second pointer from the first folder to the object is incorrect (step 702). The first pointer may be a link from the object to the folder that contains the object. In other words, the first pointer may be a link from the object to the parent of the object in the file system. The second pointer may be a link from the folder containing the object to the object. The second pointer may be a member of a group of pointers representing the contents of the folder.

The process then generates a number of folders within a second folder in the file system that represent a path from a root of the file system to the first folder (step 704) and sets the first pointer for the object to a last folder in the number of folders in which the last folder represents the first folder (step 706). The process terminates thereafter.

Figure 8:
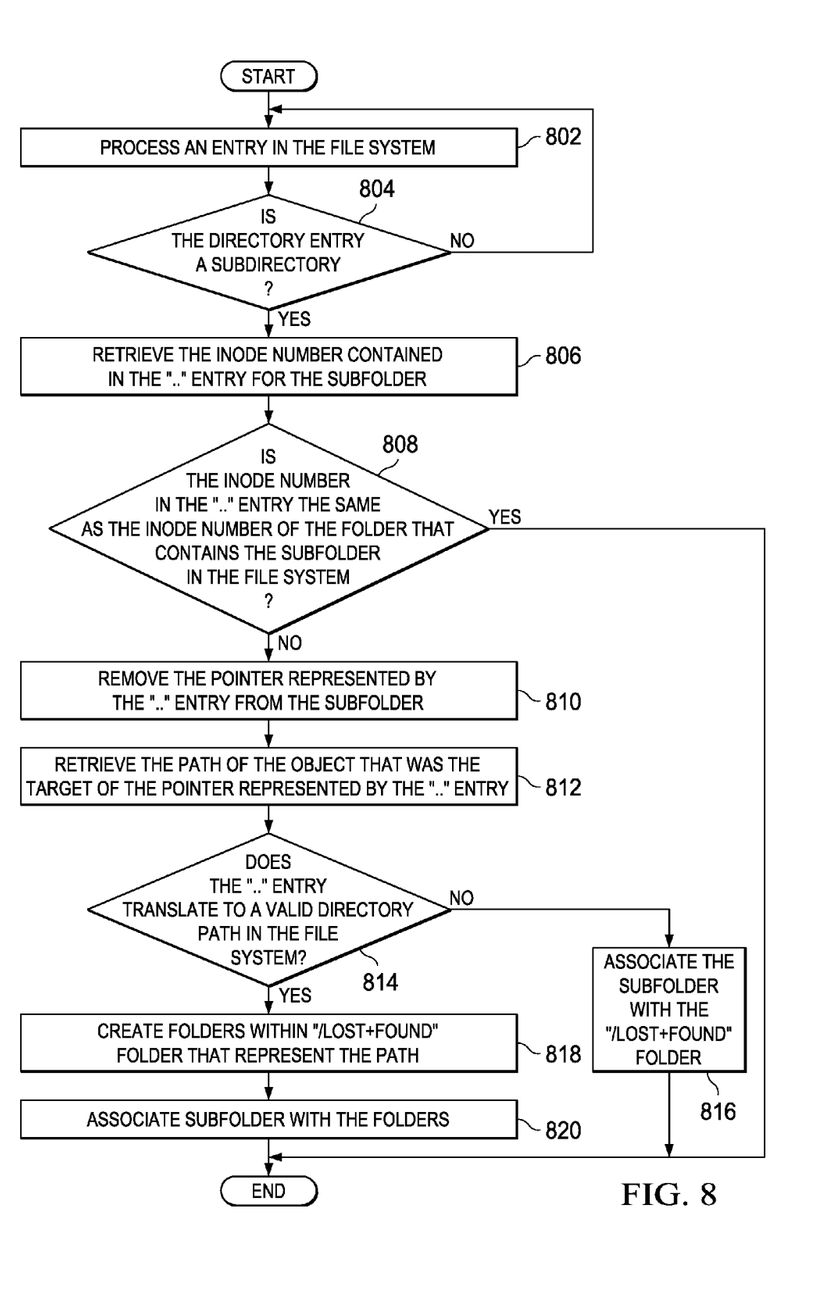
FIG. 8 is a flowchart of a process for restoring orphans in a file system depicted in accordance with an illustrative embodiment.

Looking now to FIG. 8, a flowchart of a process for restoring orphans in a file system is depicted in accordance with an illustrative embodiment. The process may be performed by file system management process 204 running on computer system 202 in FIG. 2.

The process begins and processes an entry in the file system (step 802). The process then determines whether the directory entry is a subdirectory (step 804). If the process does not determine that the directory entry is a subdirectory, the process returns to step 802. If the process determines that the directory entry is a subdirectory, the process retrieves the inode number contained in the ".." entry for the subfolder (step 806).

The process determines if the inode number in the ".." entry is the same as the inode number of the folder that contains the subfolder in the file system (step 808). If the process determines that the inode number in the ".." entry is the same as the inode number of the folder that contains the subfolder in the file system, the process terminates. If at step 808 the process determines that the inode number in the ".." entry is not the same as the inode number of the folder that contains the subfolder in the file system, the process removes the pointer represented by the ".." entry from the subfolder (step 810). The process then retrieves the path of the object that was the target of the pointer represented by the ".." entry (step 812).

The process then determines if the ".." entry translates to a valid directory path in the file system (step 814). If the process determines that the ".." entry translates to a valid directory path in the file system, the process creates folders within the "/lost+found" folder that represent the path (step 818). The process associates the subfolder with the folders (step 820) and terminates thereafter. If at step 814 the process determines that the ".." entry does not translate into a valid directory path in the file system, the process associates the subfolder with the "/lost+found" folder (step 816) and terminates thereafter.

The flowchart and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, the process may add an entry to a listing or database when an orphan is identified after step 810. The listing may be used by an administrator to identify a file system that experiences more or fewer inconsistencies and/or orphans than another file system. Additionally, the process may associate the orphan with any folder at step 816. In some illustrative embodiments, the process associates the orphan with a "/temp" folder.

Thus, the different illustrative embodiments allow a file system to be repaired without increasing the link count of a particular folder beyond the bounds of the memory location that contain the link count. Thus, the number of orphans that may be identified in the file system is increased beyond the link count of the particular folder. In some illustrative embodiments, the maximum link count for a particular folder is $2^{16}$. Additionally, the creation of the folders using the path of the folder targeted by a pointer of the orphaned object allows an administrator to identify a possible location in the file system where the object belongs.

Thus, the different illustrative embodiments provide a method, computer program product, and apparatus for managing a file system. In an illustrative embodiment, an object in the file system is identified in which one of a first pointer from the object to a first folder in the file system and a second pointer from the first folder to the object is incorrect. A number of folders is generated within a second folder in the file system that represents a path from a root of the file system to the first folder. The first pointer for the object is set to a last folder in the number of folders in which the last folder represents the first folder.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing a file system comprising:
determining whether a first target of a first pointer from an object in the file system to a first folder in the file system is an inode number for the first folder in the file system;
responsive to an absence of a determination that the first target of the first pointer from the object to the first folder is the inode number for the first folder in the file system, identifying the object in the file system as having the first pointer incorrect;
generating a number of folders within a second folder in the file system that represents a path from a root of the file system to the first folder; and
setting the first pointer for the object to a last folder in the number of folders in which the last folder in the number of folders represents the first folder.

2. The method of claim 1, wherein the step of identifying the object in the file system in which the one of the first pointer from the object to the first folder in the file system and the second pointer from the first folder to the object is incorrect comprises:
generating a listing of objects in the file system by processing a directory tree in the file system;
determining whether an identifier for the object is contained in the listing of the objects in the file system; and
responsive to an absence of a determination that the identifier for the object is contained in the listing of the objects in the file system, identifying the object in the file system as having the second pointer incorrect.

3. The method of claim 1, wherein the step of setting the first pointer for the object to the last folder in the number of folders in which the last folder represents the first folder comprises:
storing an identifier for the last folder in the first pointer from the object to the first folder in the file system.

4. The method of claim 3 further comprising:
removing the second pointer from the first folder to the object.

5. The method of claim 3, wherein the identifier is an inode number for the second folder.

6. The method of claim 1, wherein the first folder is a lost and found folder.

7. The method of claim 1, wherein the first pointer is a ".." entry for the object.

8. A computer program product comprising:
a non-transitory computer readable storage medium;
program code, stored on the non-transitory computer readable storage medium for determining whether a first target of a first pointer from an object in the file system to a first folder in the file system is an inode number for the first folder in the file system;
program code, stored on the non-transitory computer readable storage medium for responsive to an absence of a determination that the first target of the first pointer from the object to the first folder is the inode number for the first folder in the file system, identifying the object in the file system as having the first pointer incorrect;
program code, stored on the non-transitory computer readable storage medium for generating a number of folders within a second folder in the file system that represents a path from a root of the file system to the first folder; and
program code, stored on the non-transitory computer readable storage medium for setting the first pointer for the object to a last folder in the number of folders in which the last folder in the number of folders represents the first folder.

9. The computer program product of claim 8, wherein the program code for identifying the object in the file system in which the one of the first pointer from the object to the first folder in the file system and the second pointer from the first folder to the object is incorrect comprises:
program code, stored on the non-transitory computer readable storage medium, for generating a listing of objects in the file system by processing a directory tree in the file system;
program code, stored on the non-transitory computer readable storage medium for determining whether an identifier for the object is contained in the listing of the objects in the file system; and
program code, stored on the non-transitory computer readable storage medium for identifying the object in the file system as having the second pointer incorrect responsive to an absence of a determination that the identifier for the object is contained in the listing of the objects in the file system.

10. The computer program product of claim 8, wherein the program code for setting the first pointer for the object to the last folder in the number of folders in which the last folder represents the first folder comprises:
program code, stored on the non-transitory computer readable storage medium for storing an identifier for the last folder in the first pointer from the object to the first folder in the file system.

11. The computer program product of claim 10 further comprising:
program code, stored on the non-transitory computer readable storage medium for removing the second pointer from the first folder to the object.

12. The computer program product of claim 10, wherein the identifier is an inode number for the second folder.

13. The computer program product of claim 8, wherein the first folder is a lost and found folder.

14. The computer program product of claim 8, wherein the first pointer is a ".." entry for the object.

15. An apparatus comprising:
a bus system;
a storage device connected to the bus system, wherein the storage device includes program code; and
a processor unit connected to the bus system, wherein the processing unit executes the program code to determine whether a first target of a first pointer from an object in the file system to a first folder in the file system is an inode number for the first folder in the file system;

responsive to an absence of a determination that the first target of the first pointer from the object to the first folder is the inode number for the first folder in the file system, identify the object in the file system as having the first pointer incorrect, generate a number of folders within a second folder in the file system that represents a path from a root of the file system to the first folder; and set the first pointer for the object to a last folder in the number of folders in which the last folder in the number of folders represents the first folder.

* * * * *